3,143,521
PROCESS FOR GRAFT-COPOLYMERIZING
Donald F. Thompson, Landenberg, Pa., and Gerard L. Christoffels, Tewksbury, Mass., assignors to W. R. Grace & Co., Cambridge, Mass., a corporation of Connecticut
No Drawing. Filed July 21, 1960, Ser. No. 44,272
5 Claims. (Cl. 260—45.5)

This invention relates to the preparation of grafted polymers and more particularly to the preparation of such polymers by grafting onto halogenated polyolefins a copolymer of an ethylenically unsaturated aromatic hydrocarbon or halohydrocarbon and an ethylenically unsaturated carboxylic acid, salt, anhydride or nitrile thereof.

Graft copolymers are prepared by chemically attaching to a base polymer side chains of polymerizable material. The object of grafting is to modify the base polymer to give not only new but improved properties which may often be the summation of the properties of the two or more polymers.

Accordingly, it is an object of the present invention to increase the tensile strength and elastic modulus, and to decrease the percent elongation at break of the polyolefin.

Other objects are to increase the ability of the polyolefins to dissipate static charge and to increase their wettability towards water.

A further object is to decrease the gas permeability of the olefins.

Another object is to improve the printability of the polyolefin.

An additional object is to prepare novel ion exchange resins having a polyolefin skeleton.

Yet another object is to provide a process for grafting polyolefins which does not require irradiation or the use of the standard chemical polymerization initiators.

Still further objects and the entire scope of applicability of the present invention will become apparent from the detailed description given hereinafter. The detailed description and specific examples while indicating preferred embodiments of the invention are given by way of illustration only, since various changes and modifications within the spirit and scope of the invention will become apparent to those skilled in the art from the detailed description.

Now, in accordance with this invention, a novel practical and simple method of grafting side chains onto a polymer chain has been discovered which produces a new type of grafted polymer. It has been found that by employing halogenated polyolefins as the base polymer, it is possible to graft a copolymer of an ethylenically unsaturated aromatic hydrocarbon or halohydrocarbon and an ethylenically unsaturated carboxylic acid, salt, anhydride or nitrile to the base polymer without the necessity of irradiation or the addition of standard polymerization initiators, e.g. free radical generating catalysts such as benzoyl peroxide, hydrogen peroxide, sodium persulfate, perborates, percarbonates, etc. as had heretofore been the case.

Employed as base polymers in the present invention are halogenated polyethylenes, polypropylenes, copolymers of ethylene and propylene, and copolymers of ethylene and butylene, and polyethylene and polypropylene which have been irradiated and subsequently oriented.

In the examples the polyethylene employed was Alathon 14, a commercially available high pressure, branched chain polyethylene having a melt index of 1.8, an average molecular weight of 20,000 and a density of 0.916. Other polyethylenes with different molecular weights may be employed including low, medium and high density polymers produced by either high or low pressure techniques. Polypropylene can be any of those commercially available.

Irradiation and orientation of polyethylene is accomplished in the manner described in U.S. Patent No. 2,877,500 to Rainer et al. and in the copending Baird et al. application Serial No. 713,848 filed February 7, 1958 (now U.S. Patent 3,022,543), both of which are incorporated by reference herein.

Irradiation of polyethylene is preferably accomplished by subjecting extruded polyethylene tape to an electron beam from an electron beam generator, such as a commercially available 2,000,000 volt resonant transformer unit. The extent of radiation is from $2 \times 10^6$ rad to $200 \times 10^6$ rad and preferably $6 \times 10^6$ to $20 \times 10^6$ rad. At relatively high irradiation dosages, e.g. $4 \times 10^6$ rad and up there is significant cross-linking of the polyethylene. Cross-linking can be made to occur by means other than radiation as is known in the art.

The irradiated polyethylene is subsequently oriented, either monoaxially or biaxially. In orienting the polyethylene tape it is necessary to heat the tape prior to stretching. The tape can be stretched from 100 to 900% laterally and from 100 to 700% longitudinally.

Irradiation of polyethylene has the effect of producing within the polymer active sites such as free radicals or peroxides. These sites can initiate the polymerization of one or more monomers to the base polymer thereby forming covalent bonds between the base polymer and the newly formed polymer. This condition is in contrast to that of a laminate or a coating wherein the bonding is a physical attraction and may be relatively weak. The free radicals produced within the polymer by irradiation have a long half life and as a result the polymer may be grafted at any time after the irradiation. Irradiated polyethylene which is subsequently oriented does not exhibit this activity. The immersion of irradiated tape in hot water and the subsequent stretching reducing the thickness of the tape causes the destruction of the peroxides and even the free radicals which were deep seated in the tape by exposing them to heat, moisture and light as the tape is reduced in thickness. Irradiated polyethylene which is subsequently oriented is incapable of grafting without further irradiation or without the aid of a polymerization initiator.

Halogenation of polyolefins may be accomplished by the use of fluorine, chlorine or bromine in liquid or gaseous states. The reaction is normally carried out at room temperatures, although higher or lower temperatures may be employed. The halogen may be used alone or in combination with an inert solvent or gas. British Patent 581,717 to T. Myles et al. discloses a process for chlorinating polyethylene films. The halogenation of polyethylene is also disclosed in U.S. Patent 2,183,556 to Fawcett, U.S. Patent 2,398,803 to Myles et al. and British Patent 623,705 to E. I. DuPont. Halogenating agents, other than the free elements may be employed, e.g. monochlorine trifluoride, etc.

Halogenation may be carried out to an extent of from 0.01% to 85% or more based on the weight of the polyethylene or polypropylene.

The halogenated polyolefins which serve as the base to which the copolymer is grafted can be in the form of film, tubing, rods or in any other form. The base can be either unoriented or mono-oriented or biaxially oriented.

Particularly valuable as a base is biaxially oriented, polyethylene or irradiated polyethylene. Methods of forming the biaxially oriented film and tubing are disclosed in the aforesaid Rainer et al. patent and Baird et al. application.

As previously noted, the grafted copolymer of this invention consists of an ethylenically unsaturated aromatic hydrocarbon of halohydrocarbon and an ethylenically unsaturated carboxylic acid, anhydride, salt or nitrile thereof.

Examples of ethylenically unsaturated aromatic hydrocarbons or halohydrocarbons include styrene, methyl styrene, o-vinyl toluene, m-vinyl toluene, p-vinyl toluene, o-chlorostyrene, m-chlorostyrene, p-chlorostyrene, p-ethyl styrene, 2,4 dichlorostyrene, p-fluorostyrene, o-bromostyrene, etc.

As the ethylenically unsaturated carboxylic acid or derivative there can be used maleic anhydride, maleic acid, acrylonitrile, methacrylonitrile, acrylic acid, methacrylic acid, sodium acrylate, potassium methacrylate, cinnamic acid. The carboxylic acid or derivative should be one that is copolymerizable with the aromatic compound. When materials such as maleic anhydride and acrylonitrile are employed to form the copolymer which is grafted onto the base polymer, the grafted copolymer may be hydrolyzed by the use of strong alkalis, e.g., sodium hydroxide or potassium hydroxide, or in some instances by the use of strong acids, e.g., sulfuric acid.

The preferred materials to form the graft copolymer are styrene and maleic anhydride. The preferred base material is chlorinated biaxially oriented, irradiated polyethylene.

In preparing the graft copolymer there is employed from 75 to 90% by weight of the ethylenically unsaturated hydrocarbon or halohydrocarbon and from 10 to 25% by weight of the ethylenically unsaturated carboxylic acid or derivative thereof.

The polymerization temperature is not critical and room temperature may be employed for convenience.

The amount of material grafted to the base polymer will depend on the extent of halogenation and ratio of monomers in the grafting medium.

The grafted polymers of this invention when dyed with azosol, celliton and azoic dyes are reasonably fast to hot oil and lard. With dyes of the coupler-diazonium salt type (C.I. 37610, C.I. 37275) the color is completely fast to hot oil, lard and 3% acetic acid. In all cases the dyeing is rapid and intense.

*Example I*

A sample of irradiated, biaxially oriented polyethylene film is prepared by irradiating polyethylene (Alathon 14, average molecular weight, about 20,000, density 0.916 and melt index of 1.8) to an extent of about $12 \times 10^6$ rad and then stretching the polyethylene 350% in a lateral and longitudinal direction in the manner indicated in the Baird et al. application referred to above.

A sheet of the irradiated, biaxially oriented polyethylene 1 mil thick is placed in a tank and exposed to chlorine gas at a temperature of from 30 to 40° C, and simultaneously exposed to 4 ultraviolet lights (G.E. 11–A lamps having a rating of 1200 watts, 80 watts of which are useful). The film was exposed for a period of approximately 36 minutes and was chlorinated to an extent of about 23–24% by weight of the film.

A 4″ x 4″ square of the chlorinated film is then placed in a solution of styrene containing 20% by weight of maleic anhydride and held at a temperature of 23% C. for five hours. The grafted film is removed and washed with acetone and water until no copolymer of the two monomers was found in the wash solution.

A sample of the film is dried. Infrared spectra indicates a graft of the styrene-maleic anhydride copolymer.

*Example II*

A similar sample of irradiated, biaxially oriented polyethylene film which was not chlorinated was placed in the same maleic anhydride-styrene solution and held for five days and then washed as above. Infrared spectra indicated no pickup of the styrene-maleic anhydride copolymer.

*Example III*

By immersing the grafted polyethylene film of Example I in a 10% solution of sodium hydroxide for a period of 30 minutes at a temperature of 50° C., the maleic anhydride portion of the molecule is hydrolyzed to yield a graft containing carboxylate groups. This improves the wettability of the film as well as the static dissipation properties of the film. The resulting film is also useful as an ion exchange resin.

The grafted unhydrolyzed film as well as the hydrolyzed film showed improved printability over the ungrafted polyethylene.

*Example IV*

A sample of polyethylene (Alathon 14) film approximately 1.0 mil thick was chlorinated as in Example 1 and to the same extent. A sample of the chlorinated film 4″ x 4″ was placed in a solution of styrene containing 20% by weight of maleic anhydride for two hours at a temperature of 55° C. The film was washed as in Example I, and then dried. The resulting weight gain indicated a 17% graft.

What is claimed is:

1. Process for preparing a graft copolymer comprising contacting a preformed polymer material consisting essentially of a member of the group consisting of halogenated polyethylene; halogenated, oriented, high energy irradiated polyethylene; halogenated polypropylene; halogenated, oriented high energy irradiated polypropylene; halogenated copolymers of ethylene and propylene; and halogenated copolymers of ethylene and butene with a monomer mixture consisting essentially of (1) a first monomer selected from the group consisting of monoethylenically unsaturated aromatic hydrocarbons and monoethylenically unsaturated aromatic halohydrocarbons and (2) a second monomer copolymerizable with said first monomer and selected from the group consisting of maleic acid, acrylic acid, methacrylic acid, cinnamic acid and the anhydrides, metal salts and nitriles of said acids for a sufficient period of time to form a copolymer of said monomers graft copolymerized with said preformed polymer material, said contacting occurring in the absence of a free radical generating catalyst.

2. Process of claim 1 in which the preformed polymer material consists essentially of halogenated polyethylene.

3. Process of claim 1 in which the preformed polymer material consists essentially of halogenated, oriented, high energy irradiated polyethylene.

4. Process of claim 1 in which the monomer mixture consists essentially of from 75 to 90 percent by weight of styrene and correspondingly from 25 to 10 percent by weight of maleic anhydride.

5. Process of claim 4 in which the preformed polymer material consists essentially of chlorinated, oriented, high energy irradiated polyethylene.

References Cited in the file of this patent

UNITED STATES PATENTS

| | | |
|---|---|---|
| 2,837,497 | Vandenberg | June 3, 1958 |
| 3,037,948 | Landler et al. | June 5, 1962 |

FOREIGN PATENTS

| | | |
|---|---|---|
| 817,684 | Great Britain | Aug. 6, 1959 |
| 604,708 | Great Britain | July 8, 1948 |